United States Patent
Watanabe et al.

(10) Patent No.: US 12,053,834 B2
(45) Date of Patent: *Aug. 6, 2024

(54) SPOT WELDING METHOD

(71) Applicant: HONDA MOTOR CO., LTD., Tokyo (JP)

(72) Inventors: Shinya Watanabe, Tochigi (JP); Hitoshi Saito, Tochigi (JP); Xihao Tan, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 17/296,350

(22) PCT Filed: Aug. 29, 2019

(86) PCT No.: PCT/JP2019/033971
§ 371 (c)(1),
(2) Date: May 24, 2021

(87) PCT Pub. No.: WO2020/110394
PCT Pub. Date: Jun. 4, 2020

(65) Prior Publication Data
US 2022/0097164 A1 Mar. 31, 2022

(30) Foreign Application Priority Data
Nov. 26, 2018 (JP) .................... 2018-220100

(51) Int. Cl.
*B23K 11/11* (2006.01)
*B23K 11/24* (2006.01)
(52) U.S. Cl.
CPC ............. *B23K 11/115* (2013.01); *B23K 11/24* (2013.01)

(58) Field of Classification Search
CPC .... B23K 11/0033; B23K 11/115; B23K 11/24
See application file for complete search history.

(56) References Cited

U.S. PATENT DOCUMENTS

| 11,850,674 B2 * | 12/2023 | Watanabe | ............ B23K 11/115 |
| 2015/0174690 A1 * | 6/2015 | Furusako | ............ B23K 11/241 |
| | | | 219/91.22 |
| 2016/0144451 A1 * | 5/2016 | Fujimoto | ............... B23K 11/16 |
| | | | 219/92 |

FOREIGN PATENT DOCUMENTS

| CN | 101596642 A | * 12/2009 | ........... B23K 11/115 |
| CN | 104661784 A | 5/2015 | |

(Continued)

OTHER PUBLICATIONS

Machine translation of CN 101596642 A, Feb. 2024 (Year: 2024).*

(Continued)

*Primary Examiner* — Geoffrey S Evans
(74) *Attorney, Agent, or Firm* — Rankin, Hill & Clark LLP

(57) ABSTRACT

Provided is a spot welding method by which welding can be successfully performed while inhibiting occurrence of expulsion. First to third metal plates W1 to W3 were welded in which ratio of total thickness to thickness of the first metal plate W1 is 7. In Example 1, peak current value A1 is 14.6 kA, effective current value A2 is 7.8 kA, peak duration T1 is 0 ms, and no-peak duration T2 is 5.9 ms. As a result, in Example 1, lower limit current value A3 is 6.9 kA, upper limit current value A4 is 8.42 kA, difference A5 between upper limit current value A4 and lower limit current value A3 is 1.52 kA, peak duration T1/no-peak duration T2 is 0, effective current value A2/peak current value A1 is 0.53, and rising time T3/falling time T4 is 0.79, furthermore, no expulsion occurs, and welding result was determined to be OK.

9 Claims, 6 Drawing Sheets

(56) References Cited

FOREIGN PATENT DOCUMENTS

| CN | 105358284 A | 2/2016 | |
|---|---|---|---|
| CN | 111788030 A | 10/2020 | |
| JP | 2008-093726 | 4/2008 | |
| JP | 2013-501628 | 1/2013 | |
| WO | WO-2015033460 A1 * | 3/2015 | ......... B23K 11/0033 |
| WO | WO-2016088319 A1 * | 6/2016 | ............ B23K 11/11 |

OTHER PUBLICATIONS

Chinese Office Action dated Feb. 17, 2022, 10 pages.
International Search Report, Date of mailing: Nov. 19, 2019, 1 page.

* cited by examiner

FIG.6

| NO. | Peak current value A1 (kA) | Lower limit current value A3 (kA) | Upper limit current value A4 (kA) | A4-A3 current value A5 (kA) | Peak duration T1 (ms) | No-peak duration T2 (ms) | T1/T2 | Effective current value A2 (kA) | A2/A1 | T3/T4 | Expulsion occurrence | Welding result |
|---|---|---|---|---|---|---|---|---|---|---|---|---|
| Example1 | 14.6 | 6.9 | 8.42 | 1.52 | 0 | 5.9 | 0 | 7.8 | 0.53 | 0.79 | None | OK |
| Example2 | 14.6 | 6.9 | 8.42 | 1.52 | 0 | 8.7 | 0 | 7.8 | 0.53 | 0.42 | None | OK |
| Example3 | 14.6 | 6.5 | 7.9 | 1.40 | 0.9 | 8.6 | 0.105 | 7.8 | 0.53 | 0.43 | None | OK |
| Example4 | 14.6 | 6.5 | 7.9 | 1.40 | 0.9 | 13.6 | 0.066 | 7.8 | 0.53 | 0.24 | None | OK |
| Example5 | 14.6 | 7.23 | 8.27 | 1.04 | 0 | 6.1 | 0 | 7.8 | 0.53 | 0.74 | None | OK |
| Example6 | 14.6 | 7.23 | 8.27 | 1.04 | 0 | 8.1 | 0 | 7.8 | 0.53 | 0.47 | None | OK |
| Example7 | 10.6 | 7.5 | 8.57 | 1.07 | 0.9 | 3.85 | 0.234 | 8.0 | 0.75 | 2.08 | None | OK |
| Example8 | 10.6 | 7.5 | 8.57 | 1.07 | 0.9 | 4.6 | 0.196 | 8.0 | 0.75 | 1.3 | None | OK |
| Comparative Example1 | 14.6 | 6.3 | 7.15 | 0.85 | 1.8 * | 13.6 | 0.132 | 7.8 | 0.53 | 0.24 | Present | NG |
| Comparative Example2 | 14.6 | 6.3 | 7.15 | 0.85 | 1.8 * | 18.6 * | 0.097 | 7.8 | 0.53 | 0.16 | Present | NG |
| Comparative Example3 | 14.6 | 6.25 | 6.85 | 0.6 | 2.7 * | 18.1 * | 0.149 | 7.8 | 0.53 | 0.17 | Present | NG |
| Comparative Example4 | 14.6 | 6.25 | 6.85 | 0.6 | 2.7 * | 22.6 * | 0.119 | 7.8 | 0.53 | 0.13 | Present | NG |
| Comparative Example5 | 7.8* | 7.8 | 7.8 | 0 | 597.4 * | 2.6 * | 229.77 * | 7.8 | 1.0 | 0.8 | Present | NG |

* indicates a numeric value which does not satisfy one of Conditions 1 to 4 in Comparative Examples 1 to 5.

SPOT WELDING METHOD

TECHNICAL FIELD

The present invention relates to a spot welding method.

BACKGROUND ART

In case of welding a plurality of metal plates, spot welding is performed in which a spot welding apparatus is used. The spot welding comprises energizing between a pair of electrode chips in a state where the plurality of metal plates are sandwiched between the pair of electrode chips. Consequently, a nugget is generated among the plurality of metal plates to weld the plurality of metal plates.

In Patent Literature 1, a plurality of direct current micro pulses are applied to a plurality of metal plates through a pair of electrodes in a state where the plurality of metal plates are sandwiched between two electrodes, to weld the plurality of metal plates.

In case where the energization between the pair of electrode chips is performed in a short period in the spot welding, each nugget cannot grow into a size required for the welding, and the welding may not be successfully performed. On the other hand, if the energization between the pair of electrode chips continues, the nugget may excessively grow and protrude from a corona bond (an unmolten pressure welding portion formed outside the nugget) formed among the plurality of metal plates. As a result, the nugget may be exposed and expulsion (spatter) may occur. From these circumstances, in the spot welding, it is required to reliably perform welding while inhibiting occurrence of the expulsion.

CITATION LIST

Patent Literature

Patent Literature 1: Japanese Translation of PCT International Application Publication No. 2013-501628

SUMMARY OF INVENTION

Technical Problem

The present inventors have diligently investigated cause for occurrence of expulsion. It was then found that, in the execution of welding by a welding method described in Patent Literature 1 on a laminate comprising three or more superimposed metal plates, as employed in a car body, which is formed so that at least one metal plate of the three or more metal plates is different in thickness from the other metal plates, and which is formed on board conditions that the metal plate has a high plate thickness ratio from 3.5 to 10 to a total thickness of the three or more metal plates, welding can be successfully performed at increased current values but expulsion easily occurs, while at decreased current values, the expulsion does not occur but growth of nuggets does not proceed, and the welding cannot be successfully performed.

In case of the board conditions including such a high plate thickness ratio as described above, a nugget on a thick plate, side boundary surface comprising a comparatively thick plate starts to grow earlier and grows faster than a nugget on a thin plate side boundary surface comprising a comparatively thin plate. Consequently, while the nugget on the thin plate side boundary surface starts to grow and sufficiently grows, the nugget on the thick plate side boundary surface excessively grows and the expulsion might occur.

Furthermore, in case of the board conditions including the above high plate thickness ratio, if the nugget on the thick plate side boundary surface is prevented from growing excessively, the nugget on the thin plate side boundary surface cannot grow to its sufficient size, and the welding might not be successfully performed.

The present invention has been developed in view of such situations, and an object thereof is to provide a spot welding method by which welding can be successfully performed while inhibiting occurrence of expulsion.

Solution to Problem

A spot welding method of the present invention is a spot welding method comprising: joining, using pulse current, a laminate which comprises three or more superimposed metal plates, which is formed so that at least one metal plate of the three or more metal plates is different in thickness from the other metal plates, and in which a plate thickness ratio of a total thickness of the three or more metal plates to a thickness of the at least one metal plate is from 3.5 to 10, characterized in that the pulse current has a pulsed waveform in which a no-peak state is repeatedly set, wherein the no-peak state is a state where after the pulse current has reached a set peak current value from a value lower than the peak current value, the pulse current decreases from the peak current value to bottom current which is set, and again increases to the peak current value, the peak current value is set to 10.6 kA or more, a no-peak duration which is a duration of the no-peak state is set to be from 4 ms to 13.6 ms, and a peak duration which is a duration of a state of being the peak current value is set to 0.9 ms or less, and 1/5 of the no-peak duration or less.

What is obtained as a result of diligent investigation by the present inventors is that in case where the upper limit value of the peak current range is set to 10.6 kA or more, the peak duration is set to 0.9 ms or less, and further the no-peak duration which is a duration of the no-peak state is set to be from 4 ms to 13.6 ms, the peak duration which is the duration of the state of being the peak current value is set to 0.9 ms or less and 1/5 of the no-peak duration or less (a first case), cooling time can be acquired while maintaining growth of a nugget, and the welding is compatible with inhibition of occurrence of expulsion. Furthermore, in the above first case, what is obtained is that a welding current range which is a range between a lower limit current value at which the nugget having a size required for the welding is formed and an upper limit current value at which the expulsion does not occur is a wide range (e.g., 1.0 kA or more).

Therefore, according to the present invention, the welding can be successfully performed while inhibiting the occurrence of the expulsion, and furthermore, a wide welding current range can be acquired. If the wide welding current range is acquired, even an error made between a set current value and an actual current value can be permitted. Consequently, in case of continuously performing the welding by the same welding method, for example, the present invention can be implemented to continuous welding of car bodies for mass production.

A spot welding method of the present invention is a spot welding method comprising: joining, using pulse current, a laminate which comprises three or more superimposed metal plates, which is formed so that at least one metal plate of the three or more metal plates is different in thickness from the other metal plates, and in which a plate thickness ratio of a total thickness of the three or more metal plates to a thickness of the at least one metal plate is from 3.5 to 10, characterized in that the pulse current has a pulsed waveform in which a peak state and a no-peak state are alternately set, wherein the peak state is a state which starts at a point when the pulse current reaches from a value lower than a lower limit value of a set peak current range to a peak current value which is an upper limit value of the peak current range, and continues until the pulse current decreases from the peak current value to the lower limit value of the peak current range, and the no-peak state is a state where after the peak state, the pulse current decreases from the lower limit value of the peak current range to bottom current which is set, and again increases to the peak current value, the peak current value is set to 10.6 kA or more, the no-peak duration which is a duration of the no-peak state is set to be from 4 ms to 13.6 ms, and a peak duration which is a duration of the peak state is set to 0.9 ms or less and $\frac{1}{5}$ of the no-peak duration or less.

According to the present invention, the welding can be successfully performed while inhibiting the occurrence of the expulsion, and furthermore, the wide welding current range can be acquired. If the wide welding current range is acquired, even the error made between the set current value and the actual current value can be permitted. Consequently, in case of continuously performing the welding by the same welding method, for example, the present invention can be implemented to continuous welding of car bodies for mass production.

Furthermore, it is preferable that the peak duration is set to be from 0 to 0.9 ms. The case where the peak duration is 0 means a case where immediately after the pulse current has reached the peak current value from a value lower than the peak current value, the pulse current decreases from the peak current value to the bottom current.

According to this configuration, when the peak duration is 0, the pulse current decreases from the peak current value to the bottom current, immediately after having reached the peak current value from a value lower than the peak current value, and therefore the welding time can be shortened as compared with a case where the peak duration exceeds 0. In addition, when the peak duration is 0, the pulse current can be easily controlled. Furthermore, what is obtained as a result of diligent investigation by the present inventors is that even in case where the upper limit value of the peak current range is 106 kA or more, the no-peak duration is from 4 ms to 13.6 ms, and the peak duration is 0 ($\frac{1}{5}$ of the no-peak duration or less), the welding can be successfully performed while inhibiting the occurrence of the expulsion, and further the wide welding current range can be acquired.

Furthermore, it is preferable that the upper limit value of the peak current range is set to be from 10.6 kA to 20 kA.

According to this configuration, the welding can be successfully performed while further reliably inhibiting the occurrence of the expulsion, and furthermore, the wide welding current range can be acquired.

Additionally, it is preferable that the plate thickness ratio of the laminate is set to be from 4 to 7.

According to this configuration, the welding can be successfully performed while further reliably inhibiting the occurrence of the expulsion.

Furthermore, it is preferable that effective current of the pulse current in joining the laminate is set to be from 0.5 times to 0.75 times as much as the peak current value.

In case where the effective current of the pulse current in joining the laminate is set to be less than 0.5 times or in excess of 0.75 times as much as the upper limit value of the peak current range, the cooling time to cool the laminate is short and balance with nugget forming time is poor. If the cooling time is long to a certain degree, heat of a thick plate side boundary surface (the nugget grows easily) comprising a comparatively thick metal plate among the three or more metal plates is transmitted to a thin plate side boundary surface (the nugget is hard to grow) comprising a comparatively thin plate, and the growth of the nugget on the thin plate side boundary surface can be encouraged.

According to the above configuration, the nugget forming time is longer, and balance with the cooling time is better than in case where the effective current of the pulse current in joining the laminate is set to be less than 0.5 times or in excess of 0.75 times as much as the upper limit value of the peak current range. Consequently, the heat of the thick plate side boundary surface is transmitted to the thin plate side boundary surface, and the growth of the nugget on the thin plate side boundary surface can be encouraged. Therefore, the inhibition of the occurrence of the expulsion is easily compatible with the reliable welding.

Furthermore, it is preferable that the effective current value of the pulse current in joining the laminate is set to be from 0.5 times to 0.6 times as much as the peak current value, that the no-peak duration is set to be from 6 ms to 13 ms, and that the peak duration is set to be from $\frac{1}{15}$ to $\frac{1}{10}$ of the no-peak duration.

According to this configuration, the balance between the nugget forming time and the cooling time further improves, and the inhibition of the occurrence of the expulsion is easily compatible with the reliable welding. As a result, the wide welding current range can be acquired.

Additionally, it is preferable that rising time elapsed until the pulse current increases from the bottom current in the no-peak state to the peak current value is set to be shorter than falling time elapsed until the pulse current decreases from the peak current value to the bottom current, in the no-peak state.

If the rising time lengthens, the effective current value of the pulse current in joining the laminate is higher, and hence the wide welding current range cannot be acquired.

According to the above configuration, rising of the pulse current from the bottom current to the upper limit value of the peak current range is performed more rapidly than falling. Consequently, as compared with a case where the pulse current is increased moderately, the effective current value of the pulse current in joining the laminate can be suppressed, and the wide welding current range can be acquired.

Furthermore, it is preferable that the rising time is set to be from 0.1 times to 0.8 times as much as the falling time.

According to this configuration, a much wider welding current range can be acquired.

BRIEF DESCRIPTION OF DRAWINGS

FIG. 6 is a diagram showing respective numeric values during execution of welding in first to eighth Examples and first to fifth Comparative Examples.

DESCRIPTION OF EMBODIMENT

Hereinafter, description will be made as to an embodiment of the present invention with reference to the drawings.

Figure 1:
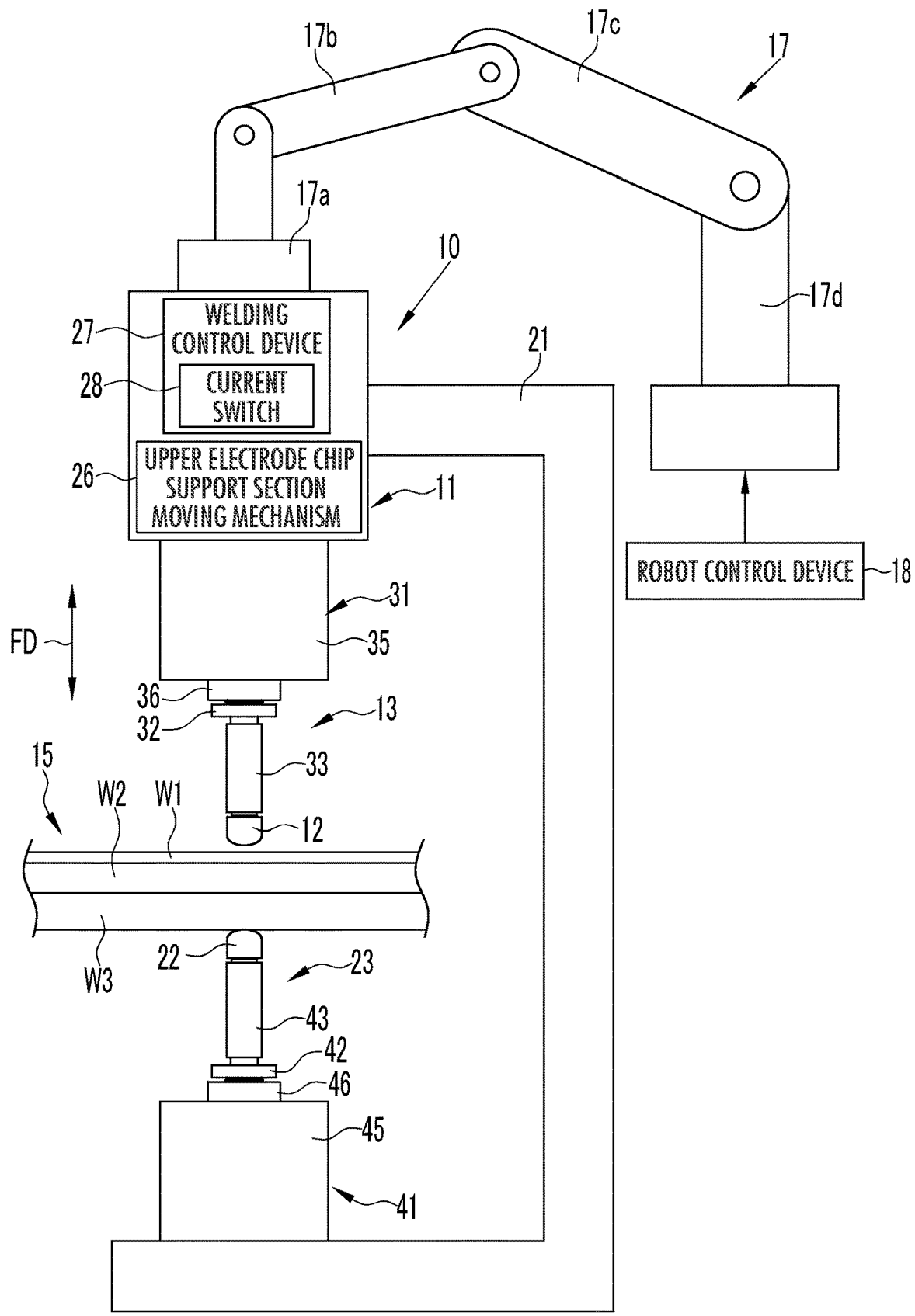
FIG. 1 is a front view showing a spot welding apparatus and a robot according to the present invention.

As shown in FIG. 1, a spot welding apparatus 10 which executes a spot welding method of the present embodiment is constituted of a welding gun, and comprises a gun body 11, an upper electrode chip 12, and an upper electrode chip support section 13 which supports the upper electrode chip 12. The spot welding apparatus 10 joins a laminate 15 comprising a first metal plate W1, a second metal plate W2 and a third metal plate W3 for use in a vehicle.

The gun body 11 is attached to a first arm 17a of a robot 17. The robot 17 is, for example, a multi-axis articulated type of robot, and comprises first to fourth arms 17a to 17d in order from a tip. The robot 17 comprises a plurality of motors (not shown) which drive the respective amass 17a to 17d, and a robot control device 18 controls the driving. Note that a root section of the robot 17 is supported by ground, a pedestal (not shown) fixed to the ground, or the like.

The robot control device 18 drives the plurality of motors of the robot 17, to drive the respective arms 17a to 17d, controls a position and an orientation of the gun body 11 attached to the arm 17a, and moves the gun body 11 to a portion of a joined part of the first to third metal plates W1 to W3.

A gun arm 21 is attached to the gun body 11. A lower electrode chip 22 is attached to a tip portion of a lower part of the gun arm 21 via a lower electrode chip support section 23. The upper electrode chip 12 and the lower electrode chip 22 are arranged opposite to each other in an up-down direction.

The gun body 11 comprises an upper electrode chip support section moving mechanism 26 which moves the upper electrode chip support section 13 in the up-down direction, and a welding control device 27 which generally controls the spot welding apparatus 10. The welding control device 27 comprises a current switch 28 to supply current (energize) between the upper electrode chip 12 and the lower electrode chip 22. In case where the current switch 28 is on, the current flows between the upper electrode chip 12 and the lower electrode chip 22. The upper electrode chip 12, the lower electrode chip 22, the upper electrode chip support section moving mechanism 26, the current switch 28 and others are driven and controlled by the welding control device 27.

Figure 2:
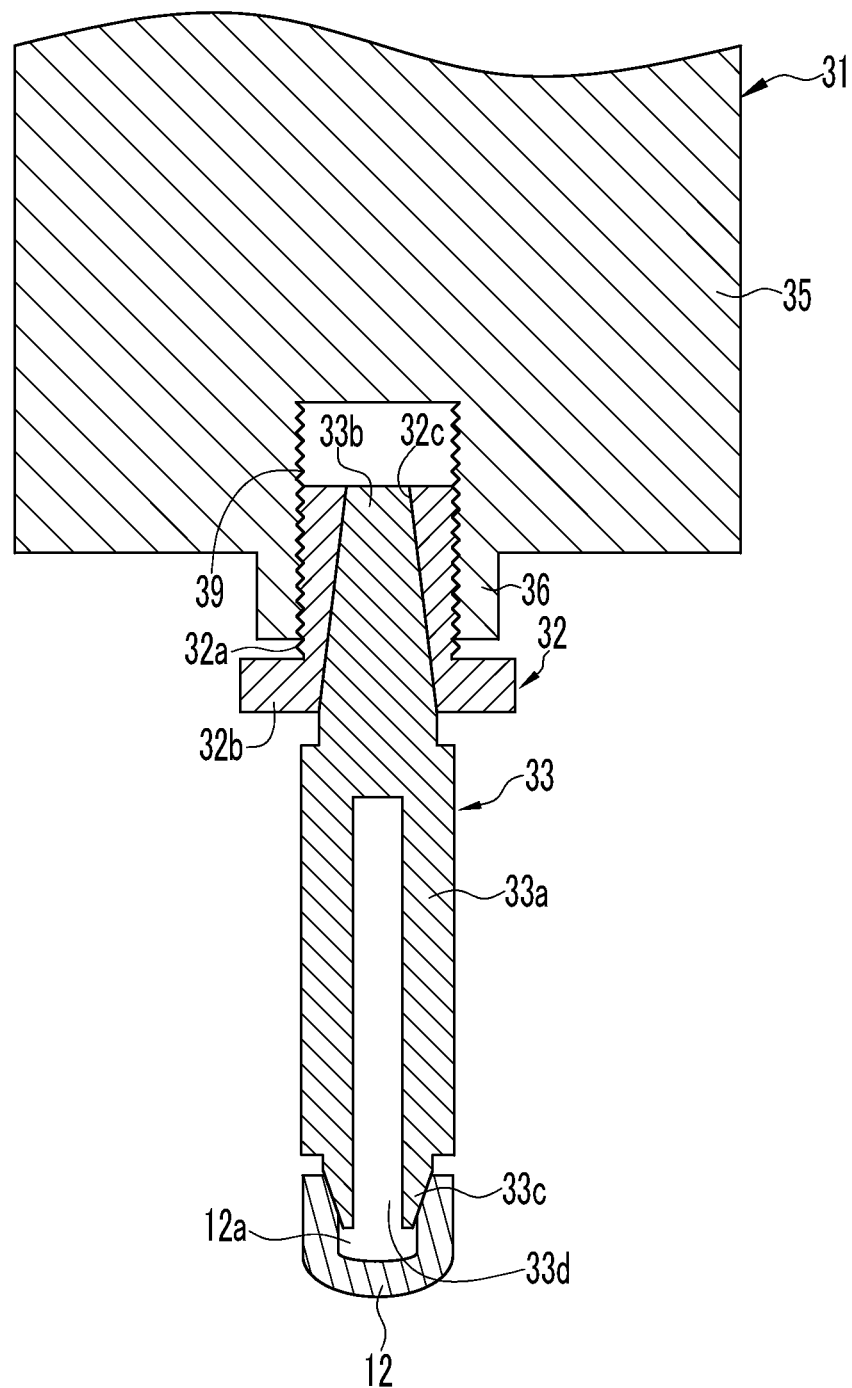
FIG. 2 is an end face view showing an upper electrode chip and an upper electrode chip support section.

As shown in FIG. 1 and FIG. 2, the upper electrode chip support section 13 comprises an upper adapter body 31 attached to the gun body 11, an upper screw adapter 32 attached to the upper adapter body 31, and an upper shank 33 attached to the upper screw adapter 32. The upper adapter body 31 is moved by the upper electrode chip support section moving mechanism 26 provided in the gun body 11 in the up-down direction.

The upper adapter body 31 comprises a columnar upper adapter body part 35, and a columnar upper adapter protrusion 36 protruding downward from a lower surface of the upper adapter body part 35.

In a central portion of a lower surface of the upper adapter protrusion 36, an upper screw hole 39 is formed by thread cutting continuously into the upper adapter body part 35.

The upper screw adapter 32 comprises an upper screw portion 32a having an outer circumference subjected to the thread cutting, and an upper screw flange portion 32b, and is formed with an upper shank attachment hole 32c extending through the upper screw adapter in the up-down direction. The upper shank attachment hole 32c is formed in a tapered shape having a diameter reduced toward the up direction.

The upper screw portion 32a of the upper screw adapter 32 is screwed into the upper screw hole 39 of the upper adapter body 31, and the upper screw adapter 32 is attached to the upper adapter body 31.

The upper shank 33 comprises an upper shank body part 33a, an upper shank attaching portion 33b press-fitted into the upper shank attachment hole 32c, and an upper electrode chip attaching portion 33c. In the upper shank 33, an upper shank recess 33d is formed continuously with the upper electrode chip attaching portion 33c and the upper shank body part 33a.

The upper shank attaching portion 33b is formed in a tapered manner along the tapered upper shank attachment hole 32c.

The upper shank attaching portion 33b of the upper shank 33 is press-fitted into the upper shank attachment hole 32c of the upper screw adapter 32, and the upper shank 33 is attached to the upper screw adapter 32.

The upper electrode chip attaching portion 33c is formed in a tapered shape having a diameter reduced toward the down direction. The upper electrode chip 12 is formed with an upper electrode chip recess 12a having a tapered portion along the tapered upper electrode chip attaching portion 33c.

The upper electrode chip attaching portion 33c of the upper shank 33 is press-fitted into the upper electrode chip recess 12a of the upper electrode chip 12, and the upper electrode chip 12 is attached to the upper shank 33.

Figure 3:
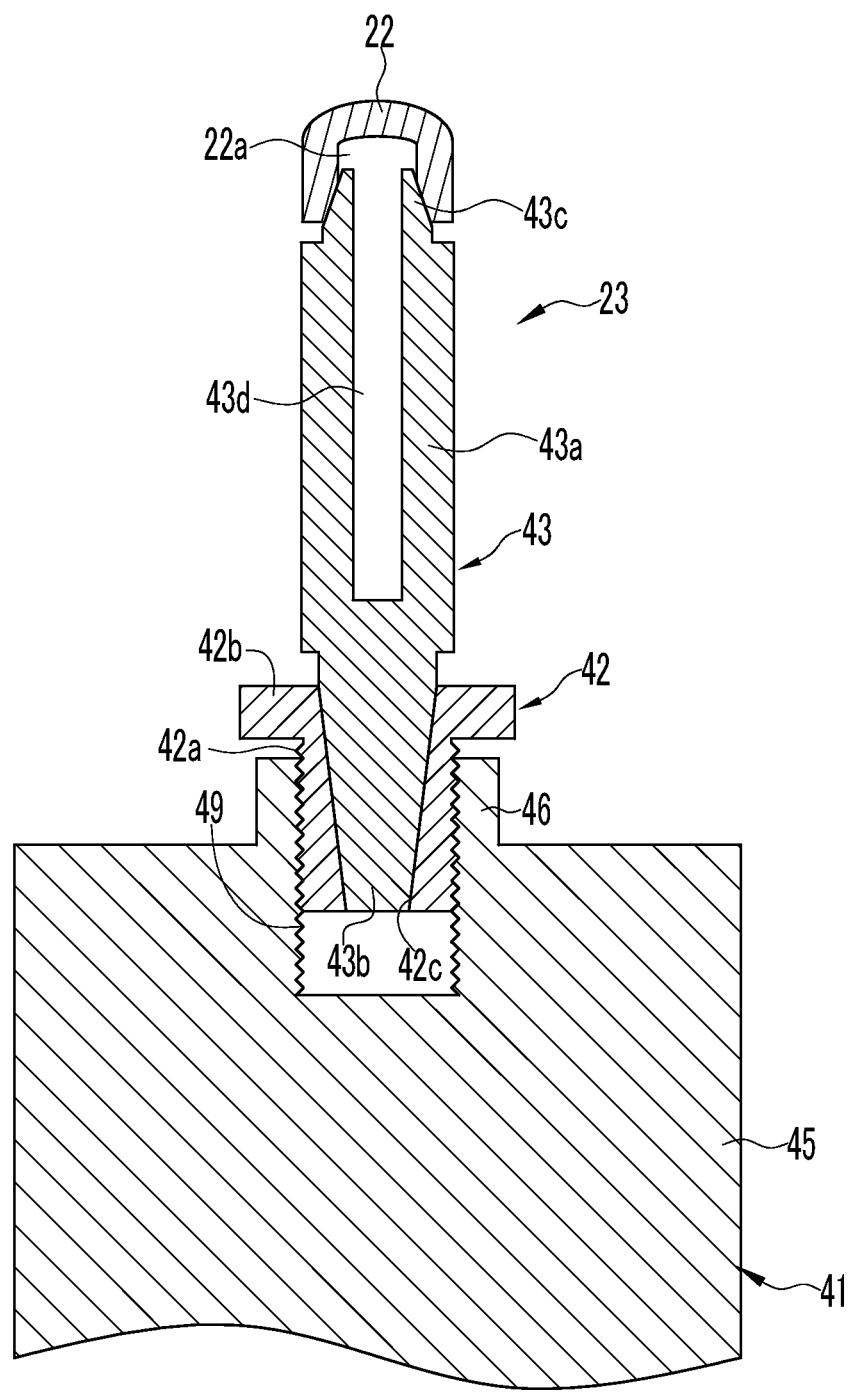
FIG. 3 is an end face view showing a lower electrode chip and a lower electrode chip support section.

As shown in FIG. 3, the lower electrode chip support section 23 comprises a lower adapter body 41, a lower screw adapter 42, and a lower shank 43. The lower adapter body 41 comprises a columnar lower adapter body part 45, and a columnar lower adapter protrusion 46 protruding upward from an upper surface of the lower adapter body part 45, in the same manner as in the upper adapter body 31.

In a central portion of a lower surface of the lower adapter protrusion 46, a lower screw hole 49 is formed by thread cutting continuously into the lower adapter body part 45.

The lower screw adapter 42 is formed in the same shape as in the upper screw adapter 32, comprises a lower screw portion 42a and a lower screw flange portion 42b, and is formed with a tapered lower shank attachment hole 42c.

The lower screw portion 42a of the lower screw adapter 42 is screwed into the lower screw hole 49 of the lower adapter body 41, and the lower screw adapter 42 is attached to the lower adapter body 41.

The lower shank 43 is formed in the same shape as in the upper shank 33, and comprises a lower shank body part 43a, a tapered lower shank attaching portion 43b, and a tapered lower electrode chip attaching portion 43c. In the lower shank 43, a lower shank recess 43d is formed continuously with the lower electrode chip attaching portion 43c and the lower shank body part 43a.

The lower shank attaching portion 43b of the lower shank 43 is press-fitted into the lower shank attachment hole 42c of the lower screw adapter 42, and the lower shank 43 is attached to the lower screw adapter 42.

The lower electrode chip 22 is formed with a lower electrode chip recess 22a having a tapered portion along the tapered lower electrode chip attaching portion 43c.

The lower electrode chip attaching portion 43c of the lower shank 43 is press-fitted into the lower electrode chip recess 22a of the lower electrode chip 22, and the lower electrode chip 22 is attached to the lower shank 43.

[Metal Plate Welding]

Next, a spot welding method of the first to third metal plates W1 to W3 by the spot welding apparatus 10 will be described.

First, as shown in FIG. 1, the robot control device 18 drives the plurality of motors of the robot 17, to drive the respective arms 17a to 17d, and moves the spot welding apparatus 10 to a position where the first to third metal plates W1 to W3 are arranged between the upper electrode chip 12 and the lower electrode chip 22. At this time, the lower electrode chip 22 abuts on a lower surface of the third metal plate W3.

Figure 4:
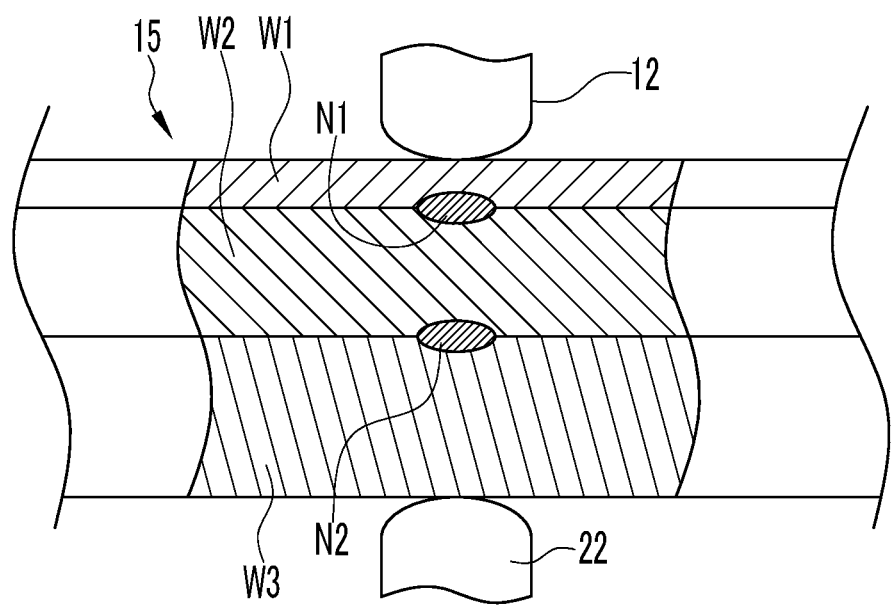
FIG. 4 is a side view showing the upper electrode chip, the lower electrode chip and first to third metal plates in a state where the first to third metal plates are sandwiched between the upper electrode chip and the lower electrode chip.

Next, as shown in FIG. 4, the welding control device 27 of the spot welding apparatus 10 drives the upper electrode chip support section moving mechanism 26, to move the upper electrode chip support section 13 downward.

When the upper electrode chip 12 moves downward to abut on an upper surface of the first metal plate W1, the first to third metal plates W1 to W3 are pressed and sandwiched between the upper electrode chip 12 and the lower electrode chip 22.

Next, the welding control device 27 turns on the current switch 28 in a state where the first to third metal plates W1 to W3 are pressed and sandwiched between the upper electrode chip 12 and the lower electrode chip 22, to supply current (energize) between the upper electrode chip 12 and the lower electrode chip 22. Through this energization, a first nugget N1 is formed between the first metal plate W1 and the second metal plate W2, and a second nugget N2 is formed between the second metal plate W2 and the third metal plate W3, so that the first to third metal plates W1 to W3 are welded.

EXAMPLES

Figure 5:
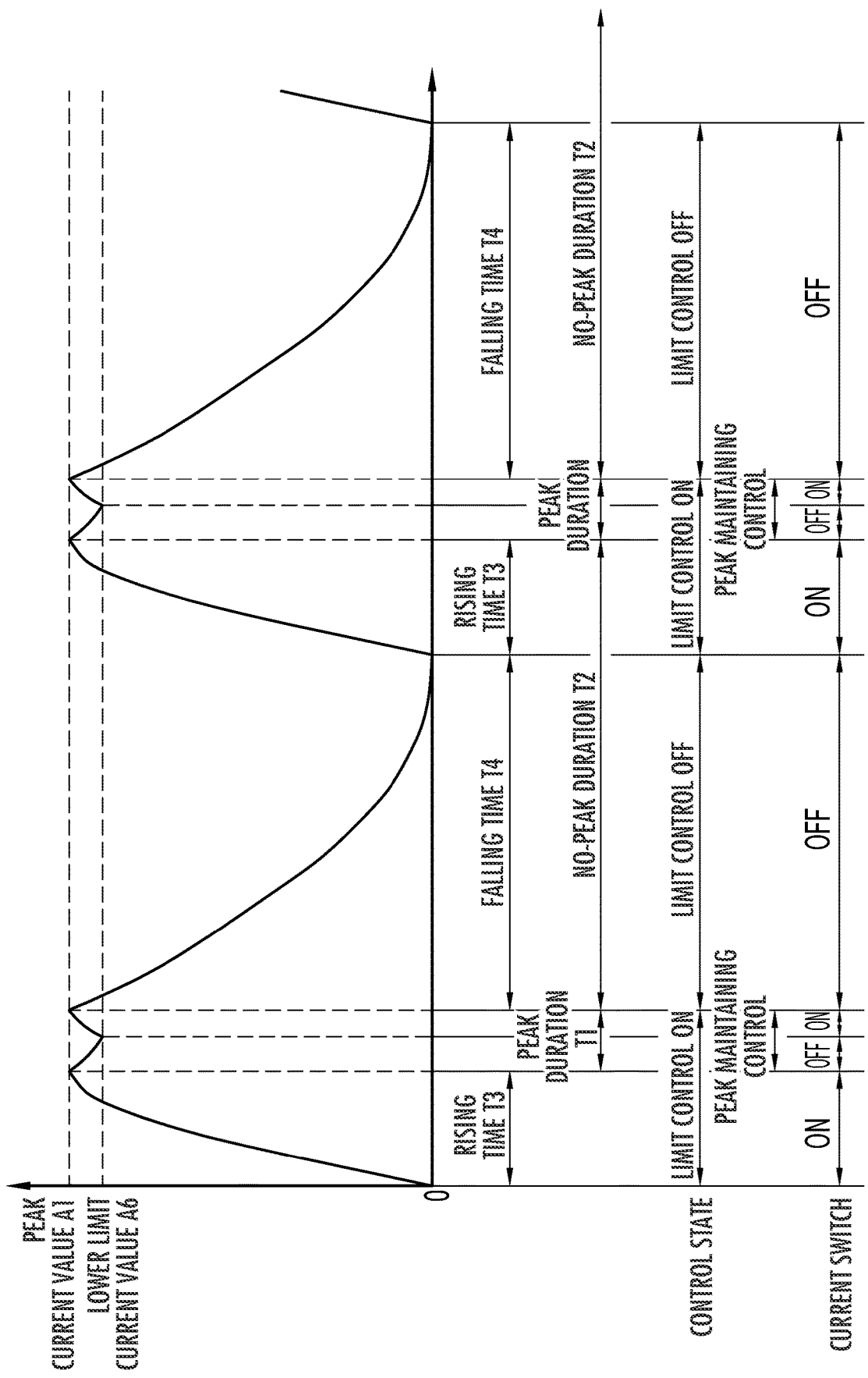
FIG. 5 is a diagram showing a pulsed waveform of a current supplied between the upper electrode chip and the lower electrode chip.

By use of the spot welding apparatus 10, experiments (Examples 1 to 8 and Comparative Examples 1 to 5) were performed in which DC chopping pulse current having such a pulsed waveform as shown in FIG. 5 (hereinafter, referred to simply as the pulse current) was supplied between the upper electrode chip 12 and the lower electrode chip 22, to weld first to third metal plates W1 to W3 sandwiched between the upper electrode chip 12 and the lower electrode chip 22.

In the above experiments, the first metal plate W1 comprises a galvanized steel plate having a thickness of 0.6 mm and a tensile strength of 270 MPa, the second metal plate W2 comprises a non-plated steel plate having a thickness of 1.6 mm and a tensile strength of 780 MPa, and the third metal plate W3 comprises a non-plated steel plate having a thickness of 2.0 mm and a tensile strength of 980 MPa. The first to third metal plates W1 to W3 have different plate thicknesses, and a ratio of a total thickness (4.2 mm) of the first to third metal plates W1 to W3 to the thickness (0.6 mm) of the first metal plate W1 is 7.

As the above experiments, conditions of a targeted peak current value A1 (kA) (an upper limit value of a peak current range), an effective current value A2 (an effective current value during execution of the welding) (kA), a peak duration T1 (ms), and a no-peak duration T2 (ms) were changed to perform the experiments (Examples 1 to 8 and Comparative Examples 1 to 5).

Then, in Examples 1 to 8 and Comparative Examples 1 to 5, obtained were a lower limit current value A3 (kA), an upper limit current value A4 (an expulsion current value) at which expulsion did not occur, a difference A5 between the upper limit current value A4 and the lower limit current value A3, the peak duration T1/the no-peak duration T2, the effective current value A2/the peak current value A1, rising time T3/failing time T4, visually confirmed presence or absence of the expulsion occurrence, and determination of acceptability: acceptable or not acceptable (OK or NG) of a welding result. Note that for the OK/NG of the welding result, in case where a nugget having a diameter required for the welding was prepared, the determination was OK. Furthermore, the lower limit current value A3 is a lower limit current value at which the nugget (the nugget having a size required for the welding) calculated with $4\sqrt{t}$ is formed.

In the present embodiment, the welding control device 27 turns on/off the current switch 28 to supply the pulse current, to perform limit control of a pulse current value.

The welding control device 27 turns on the current switch 28 in a state where the pulse current value is zero (bottom current) and energizes between the upper electrode chip 12 and the lower electrode chip 22, to turn on (start) the limit control.

The welding control device 27 starts peak maintaining control described later in detail, when the pulse current value increases from zero to the peak current value A1 during limit control ON. The peak maintaining control is performed as a part of the limit control ON.

In the peak maintaining control, the welding control device 27 turns off the current switch 28 to stop the energization (energization stop control). The stopping of the energization decreases the pulse current value from the peak current value A1 to a lower limit peak current value A6 (a lower limit value of the peak current range) which is 90% of the peak current value A1.

In the peak maintaining control, the welling control device 27 turns on the current switch 28 to start the energization, when the pulse current value decreases from the peak current value A1 to the lower limit peak current value A6 (energization start control). The start of the energization increases the pulse current value from the lower limit peak current value A6 to the peak current value A1.

The welding control device 27 performs the peak maintaining control comprising the energization stop control and the energization start control, for example, once in the peak duration T1. This peak maintaining control maintains the pulse current value in the peak current range between the lower limit peak current value A6 and the peak current value A1.

In the present embodiment, a start point of a peak state is time when the pulse current value increases from zero to the peak current value A1, and an end point of the peak state is time when the peak maintaining control is performed once and the pulse current value increases from the lower limit peak current value A6 to the peak current value A1.

The peak duration T1 is a duration when the peak state is maintained, and a period of time when the peak maintaining control is performed. In the present embodiment, one peak maintaining control is, for example, 0.9 ms, and the peak maintaining control may be performed a plurality of times in the peak duration T1. For example, when the peak maintaining control is performed once, the peak duration T1 is 0.9 ms; when the peak maintaining control is performed twice, the peak duration T1 is 1.8 ms; and when the peak maintaining control is performed three times, the peak duration T1 is 2.7 ms.

A start point of a no-peak state is time when the peak duration T1 (the peak maintaining control) ends, and an end point of the no-peak state is time when the pulse current value decreases to zero and again increases to the peak current value A1. The no-peak duration T2 is a duration of the no-peak state.

When the peak duration T1 (*ms*) ends, the welding control device 27 turns off (stops) the limit control, and turns off the ON current switch 28 to stop the energization. Then, when the pulse current value decreases to zero, the limit control turns on, and the above described limit control and peak maintaining control are performed again. Note that limit control OFF ends when set time is counted with a timer (not shown), and automatically switches to limit control ON. Time of the limit control ON is variable in accordance with the peak current value A1 or the like.

In the present embodiment, control once by the limit control ON and control once by the limit control OFF are defined as one pulse, and are repeatedly performed a plurality of times (e.g., 100 pulses) in welding the same region.

The rising time T3 is time from when the limit control turns on in the state where the pulse current value is zero (tire bottom current) and the pulse current starts to flow until the pulse current value reaches the peak current value A1. The falling time T4 is time from when the peak duration T1 (*ms*) ends until the pulse current value becomes zero.

Examples 1, 2, 5 and 6, in which the peak duration T1 (*ms*) is 0 (zero), are Examples in case where the peak maintaining control is not performed. In this case, the rising time T3 is time from when the limit control turns on in the state where the pulse current value is zero (the bottom current) and the pulse current starts to flow until the pulse current value reaches the peak current value A1, and the falling time T4 is time from when the pulse current value reaches the peak current value A1 until the pulse current value becomes zero. Furthermore, when the peak duration T1 (*ins*) is 0, the pulse current decreases from the peak current value A1 to 0 (the bottom current), immediately after having reached the peak current value A1 from a value lower than the peak current value A1, therefore the welding time can be shortened as compared with a case where the peak duration T1 exceeds 0, and furthermore, the pulse current can be easily controlled.

Example 1

In Example 1, the peak current value A1 was 14.6 kA, the effective current value A2 was 7.8 kA, the peak duration T1 was 0 ms, and the no-peak duration T2 was 5.9 ms. As a result, in Example 1, the lower limit current value A3 was 6.9 kA, the upper limit current value A4 was 8.42 kA, the difference A5 between the upper limit current value A4 and the lower limit current value A3 was 1.52 kA, the peak duration T1/the no-peak duration T2 was 0, the effective current value A2/the peak current value A1 was 0.53, the rising time T3/the falling time T4 was 0.79, and furthermore, no expulsion occurred; and the welding result was determined to be OK.

In Examples 1 to 8 and Comparative Examples 1 to 5, it was determined whether or not the following Conditions 1 to 10 were satisfied.

[Condition 1]

A laminate is to be the laminate 15 which comprises three or more superimposed metal plates (the first to third metal plates W1 to W3), which is formed so that at least one metal plate (the first metal plate W1) of the three or more metal plates (the first to third metal plates W1 to W3) is different in thickness from the other metal plates (the second and third metal plates W2 and W3), and in which a plate thickness ratio of a total thickness of the three or more metal plates (the first to third metal plates W1 to W3) to a thickness of the at least one metal plate (the first metal plate W1) is from 3.5 to 10.

[Condition 2]

The peak current value A1 is to be set to be from 10.6 kA to 20 kA.

[Condition 3]

The peak duration T1 which is a duration of the peak state is to be set to be from 0 to 0.9 ms.

[Condition 4]

The no-peak duration T2 which is a duration of the no-peak state is to be set to be from 4 ms to 13.6 ms, and the peak duration T1 is to be set to ⅕ of the no-peak duration T2 or less.

[Condition 5]

The laminate is to be the laminate 15 in which the plate thickness ratio of the total thickness of the three or more metal plates (the first to third metal plates W1 to W3) to the thickness of the at least one metal plate (the first metal plate W1) is from 4 to 7.

[Condition 6]

The effective current value A2 is to be set to be from 0.5 times to 0.75 times as much as an upper limit (the peak current value A1) of the peak current range (between the lower limit peak current value A6 and the peak current value A1).

[Condition 7]

The effective current value A2 is to be set to be from 0.5 times to 0.6 times as much as the upper limit (the peak current value A1) of the peak current range (between the lower limit peak current value A6 and the peak current value A1), the no-peak duration T2 is to be set to be from 6 ms to 13.6 ms, and the peak duration T1 is to be set to be from 1/15 to 1/10 of the no-peak duration T2.

[Condition 8]

The rising time T3 is to be set to time shorter than the falling time T4.

[Condition 9]

The rising time T3 is to be set to be from 0.1 times to 0.8 times as much as the falling time T4.

Example 1 satisfies the above Conditions 1 to 6, 8 and 9. Furthermore, Example 1 does not satisfy a part of Condition 7 that the effective current value A2 is set to be from 0.5 times to 0.6 times as much as the peak current value A1, that the no-peak duration T2 is set to be from 6 ms to 13.6 ms, and that the peak duration T1 is set to be from 1/15 (0.066) to 1/10 (0.1) of the no-peak duration T2 (in Example 1, 0.53 times, 5.9 ms, 0). However, even in Example 1 which was a little off the lower limit of the above Condition 7, no expulsion occurs, and the welding result is determined to be OK. Consequently, the Example has the validity of the above Condition 7.

Note that also in case where the peak current value A1 was the upper limit value of 20 kA of the above Condition 2, a result similar to that of Example 1 was obtained. Furthermore, also in case where the effective current value A2 was 0.5 times or 0.75 times as much as the peak current value A1, a result similar to that of Example 1 was obtained.

In case of continuously performing the welding by the same welding method by use of the spot welding apparatus 10, for example, in case of continuously welding car bodies for mass production, an error is generated between a set pulse current value and an actual pulse current value in executing the welding. Consequently, in case where the difference A5 between the upper limit current value A4 and the lower limit current value A3 is less than 1 kA, the upper limit current value A4 and the lower limit current value A3 vary due to the error, and the welding might not be performed. Therefore, the process with such conditions cannot be implemented to the welding of the car bodies for the mass production. To solve the problem, as a result of diligent investigation by the present inventors, it has been found that if the difference A5 between the upper limit current value A4 and the lower limit current value A3 is 1 kA or more, even if the error is generated, the process with such conditions can be implemented to the welding of the car bodies for the mass production.

In Example 1, the difference A5 between the upper limit current value A4 and the lower limit current value A3 is 1.52 kA, and hence the Example can be implemented to the welding of the car bodies for the mass production.

Example 2

In Example 2, the peak current value A1 was 14.6 kA, the effective current value A2 was 7.8 kA, the peak duration T1 was 0 ms, and the no-peak duration T2 was 8.7 ms. As a result, in Example 2, the lower limit current value A3 was 6.9 kA, the upper limit current value A4 was 8.42 kA, the difference A5 between the upper limit current value A4 and the lower limit current value A3 was 1.52 kA, the peak duration T1/the no-peak duration T2 was 0, the rising time T3/the falling time T4 was 0.42, furthermore, no expulsion occurred, and the welding result was determined to be OK.

Example 2 satisfies the above Conditions 1 to 6, 8 and 9. Furthermore, Example 2 does not satisfy a part of Condition 7 that the effective current value A2 is set to be from 0.5 times to 0.6 times as much as the peak current value A1, that the no-peak duration T2 is set to be from 6 ms to 13.6 ms, and that the peak duration T1 is set to be from 1/15 (0.066) to 1/10 (0.1) of the no-peak duration T2 (in Example 2, 0.53 times, 8.7 ms, 0). However, even in Example 2 which is a little off the lower limit of the above Condition 7, no expulsion occurs, and the welding result is determined to be OK. Consequently, the Example has the validity of the above Condition 7.

Example 3

In Example 3, the peak current value A1 was 14.6 kA, the effective current value A2 was 7.8 kA, the peak duration T1 was 0.9 ms, and the no-peak duration T2 was 8.6 ms. As a result, in Example 3, the lower limit current value A3 was 6.5 kA, the upper limit current value A4 was 7.9 kA, the difference A5 between the upper limit current value A4 and the lower limit current value A3 was 1.4 kA, the peak duration T1the no-peak duration T2 was 0.105, the rising time T3/the falling time T4 was 0.43, furthermore, no expulsion occurred, and the welding result was determined to be OK.

Example 3 satisfies the above Conditions 1 to 6, 8 and 9. Furthermore, Example 3 does not satisfy a part of Condition 7 that the effective current value A2 is set to be from 0.5 times to 0.6 times as much as the peak current value A1, that the no-peak duration T2 is set to be from 6 ms to 13.6 ms, and that the peak duration T1 is set to be from 1/15 (0.066) to 1/10 (0.1) of the no-peak duration T2 (in Example 3, 0.53 times, 8.6 ms, 0.105). However, even in Example 3 which is a little off the upper limit of the above Condition 7, no expulsion occurs, and the welding result is determined to be OK. Consequently, the Example has the validity of the above Condition 7.

Example 4

In Example 4, the peak current value A1 was 14.6 kA, the effective current value A2 was 7.8 kA, the peak duration T1 was 0.9 ms, and the no-peak duration T2 was 13.6 ms. As a result, in Example 4, the lower limit current value A3 was 6.5 kA, the upper limit current value A4 was 7.9 kA, the difference A5 between the upper limit current value A4 and the lower limit current value A3 was 1.4 kA, the peak duration T1/the no-peak duration T2 was 0.066, the rising time T3/the falling time T4 was 0.24, furthermore, no expulsion occurred, and the welding result was determined to be OK.

Example 4 satisfies the above Conditions 1 to 9. Furthermore, in Example 4, the difference A5 between the upper limit current value A4 and the lower limit current value A3 is 1.4 kA, and hence the Example can be implemented to the welding of the car bodies for the mass production.

Example 5

In Example 5, the peak current value A1 was 14.6 kA, the effective current value A2 was 7.8 kA, the peak duration T1 was 0 ms, and the no-peak duration T2 was 6.1 ms. As a result, in Example 5, the lower limit current value A3 was 7.2.3 kA, the upper limit current value A4 was 8.27 kA, the difference A5 between the upper limit current value A4 and the lower limit current value A3 was 1.04 kA, the peak duration T1/the no-peak duration T2 was 0, the rising time T3/the falling time T4 was 0.74, furthermore, no expulsion occurred, and the welding result was determined to be OK.

Example 5 satisfies the above Conditions 1 to 9. Furthermore, in Example 5, the difference A5 between the upper limit current value A4 and the lower limit current value A3 is 1.04 kA, and hence the Example can be implemented to the welding of the car bodies for the mass production.

Example 6

In Example 6, the peak current value A1 was 14.6 kA, the effective current value A2 was 7.8 kA, the peak duration T1 was 0 ms, and the no-peak duration T2 was 8.1 ms. As a result, in Example 6, the lower limit current value A3 was 7.23 kA, the upper limit current value A4 was 8.27 kA, the difference A5 between the upper limit current value A4 and the lower limit current value A3 was 1.04 kA, the peak duration T1/the no-peak duration T2 was 0, the rising time T3/the falling time T4 was 0.47, furthermore, no expulsion occurred, and the welding result was determined to be OK.

Example 6 satisfies the above Conditions 1 to 9. Furthermore, in Example 6, the difference A5 between the upper limit current value A4 and the lower limit current value A3 is 1.04 kA, and hence the Example can be implemented to the welding of the car bodies for the mass production.

Example 7

In Example 7, the peak current value A1 was 10.6 kA, the effective current value A2 was 8.0 kA, the peak duration T1 was 0.9 ms, and the no-peak duration T2 was 3.85 ms. As a result, in Example 7, the lower limit current value A3 was 7.5 kA, the upper limit current value A4 was 8.57 kA, the difference A5 between the upper limit current value A4 and the lower limit current value A3 was 1.07 kA, the peak duration T1/the no-peak duration T2 was 0.234, the rising time T3/the falling time T4 was 2.08, furthermore, no expulsion occurred, and the welding result was determined to be OK.

Example 7 satisfies the above Conditions 1 to 3, 5 and 6. Furthermore, Example 7 does not satisfy Condition 4 that the peak duration T1 is set to ⅕ (0.2) of the no-peak duration T2 or less (in Example 7, 0.234). However, even in Example 7 which is a little off the upper limit of the above Condition 4, no expulsion occurs, and the welding result is determined to be OK. Consequently, the Example has the validity of the above Condition 4.

Example 7 does not satisfy Conditions 8 and 9 that the rising time T3 is set to be time shorter than the falling time T4, and time from 0.1 times to 0.8 times as much as the falling time T4 (in Example 7, 2.08 times). However, even in Example 7 which is a little off the upper limit of the above Conditions 8 and 9, no expulsion occurs, and the welding result is determined to be OK. Consequently, the Example has the validity of the above Conditions 8 and 9.

Furthermore, Example 7 does not satisfy Condition 7 that the effective current value A2 is set to be from 0.5 times to 0.6 times as much as the peak current value A1, that the no-peak duration T2 is set to be from 6 ms to 13.6 ms, and that the peak duration is set to be from 1/15 (0.066) to 1/10 (0.1) of the no-peak duration T2 (in Example 7, 0.75 times, 3.85 ms, 0.234). However, even in Example 7 which is a little off the upper limit and lower limit of the above Condition 7, no expulsion occurs, and the welding result is determined to be OK. Consequently, the Example has the validity of the above Condition 7.

In Example 7, the difference A5 between the upper limit current value A4 and the lower limit current value A3 is 1.07 kA, and hence the Example can be implemented to the welding of the car bodies for the mass production.

Example 8

In Example 8, the peak current value A1 was 10.6 kA, the effective current value A2 was 8.0 kA, the peak duration T1 was 0.9 ms, and the no-peak duration T2 was 4.6 ms. As a result, in Example 8, the lower limit current value A3 was 7.5 kA, the upper limit current value A4 was 8.57 kA, the difference A5 between the upper limit current value A4 and the lower limit current value A3 was 1.07 kA, the peak duration T1/the no-peak duration T2 was 0.196, the rising time T3/the falling time T4 was 1.3, furthermore, no expulsion occurred, and the welding result was determined to be OK.

Example 8 satisfies the above Conditions 1 to 6. Furthermore, Example 8 does not satisfy Conditions 8 and 9 that the rising time T3 is set to be time shorter than the falling time T4, and time from 0.1 times to 0.8 times as much as the falling time T4 (in Example 8, 1.3 times). However, even in Example 8 which is a little off the upper limit of the above Conditions 8 and 9, no expulsion occurs, and the welding result is determined to be OK. Consequently, the Example has the validity of the above Conditions 8 and 9.

Example 8 does not satisfy a part of Condition 7 that the effective current value A2 is set to be from 0.5 times to 0.6 times as much as the peak current value A1, that the no-peak duration T2 is set to be from 6 ms to 13.6 ms, and that the peak duration T1 is set to be from 1/15 (0.066) to 1/10 (0.1) of the no-peak duration T2 (in Example 8, 0.75 times, 4.6 ms, 0.196). However, even in Example 8 which is a little off the upper limit of the above Condition 7, no expulsion occurs, and the welding result is determined to be OK. Consequently, the Example has the validity of the above Condition 7.

In Example 8, the difference A5 between the upper limit current value A4 and the lower limit current value A3 is 1.07 kA, and hence the Example can be implemented to the welding of the car bodies for the mass production.

Thus, in Examples 1 to 8, no expulsion occurred, and the welding result was determined to be OK. Furthermore, it is seen from Examples 1 to 8 that there are validities of the above Conditions 1 to 9. Additionally, in Examples 1 to 8, the difference A5 between the upper limit current value A4 and the lower limit current value A3 is 1 kA or more, and hence the Examples can be implemented to the welding of the car bodies for the mass production.

Furthermore, in Examples 1 to 6, the effective current value A2 of the pulse current in joining the laminate 15 is set to be from 0.5 times to 0.75 times of the peak current value A1, and hence time to form the first nugget N1 and the second nugget N2 is longer and balance with cooling time is better than in case where the ratio is set to be less than 0.5 times, or in excess of 0.75 times. Consequently, heat of a boundary surface between the second metal plate W2 and the third metal plate W3 (a thick plate side boundary surface) is transmitted to a boundary surface between the first metal plate W1 and the second metal plate W2 (a thin plate side boundary surface), and growth of the first nugget N1 on the thin plate side boundary surface can be encouraged. Therefore, inhibition of the occurrence of the expulsion is easily compatible with reliable welding.

Additionally, in Examples 1 to 6, since the rising time T3 is in a range of 0.1 to 0.8 times as much as the falling time T4, rising at the rising time is performed more rapidly than falling. Consequently, as compared with a case where the rising at the rising time is performed more moderately than the falling, the effective current value A2 in joining the laminate 15 can be suppressed, and a wide welding current range can be acquired.

Note that when at least the above Conditions 1 to 4 were satisfied among the above Conditions 1 to 9, it was possible to obtain an experiment result indicating that no expulsion occurred and that the welding result was determined to be OK.

Furthermore, when the ratio of the total thickness of the first to third metal plates W1 to W3 to the thickness of the first metal plate W1 was in a range of 3.5 to 10, a result similar to those of the above Examples 1 to 8 was obtained.

Comparative Example 1

In Comparative Example 1, the peak current value A1 was 14.6 kA, the effective current value A2 was 7.8 kA, the peak duration T1 was 1.8 ms, and the no-peak duration T2 was 13.6 ms. As a result, in Comparative Example 1, the lower limit current value A3 was 6.3 kA, the upper limit current value A4 was 7.15 kA, the difference A5 between the upper limit current value A4 and the lower limit current value A3 was 0.85 kA, the peak duration no-peak duration T2 was 0.132, the rising time T3/the falling time T4 was 0.24, furthermore, the expulsion occurred, and it was determined that the welding result was NG.

Comparative Example 1 satisfies the above Conditions 1, 2, 4 to 6, 8 and 9, but the peak duration T1 does not satisfy Condition 3 that the duration is set to be from 0 to 0.9 ms (in Comparative Example 1, 1.8 ms), and the peak duration T1 does not satisfy the condition that the duration is set to be from ⅟₁₅ (0.066) to ⅟₁₀ (0.1) of the no-peak duration T2 in the above Condition 7 (in Comparative Example 1, 0.132 ms).

Since Comparative Example 1 did not satisfy Condition 3 and a part of Condition 7, the expulsion occurred, and also the welding result was NG. Specifically, in Comparative Example 1, the peak duration T1 was longer (1.8 ms) than in Condition 3 (from 0 to 0.9 ms). Consequently, the first nugget N1 and the second nugget N2 excessively grew, and protruded from a corona bond (an unmolten pressure welding portion formed outside the first nugget N1 and the second nugget N2). As a result, the first nugget N1 and the second nugget N2 were exposed and the expulsion occurred.

Additionally, in Comparative Example 1, the difference A5 between the upper limit current value A4 and the lower limit current value A3 is 0.85 kA, and hence the Example cannot be implemented to the welding of the car bodies for the mass production.

Comparative Example 2

In Comparative Example 2, the peak current value A1 was 14.6 kA, the effective current value A2 was 7.8 kA, the peak duration T1 was 1.8 ms, and the no-peak duration T2 was 18.6 ms. As a result, in Comparative Example 2, the lower limit current value A3 was 6.3 kA, the upper limit current value A4 was 7.15 kA, the difference A5 between the upper limit current value A4 and the lower limit current value A3 was 0.85 kA, the peak duration T1/the no-peak duration T2 was 0.097, the rising time T3/the falling time T4 was 0.16, furthermore, the expulsion occurred, and it was determined that the welding result was NG.

Comparative Example 2 satisfies the above Conditions 1, 2, 5, 6, 8 and 9, but the peak duration T1 does not satisfy Condition 3 that the duration is set to be from 0 to 0.9 ms (in Comparative Example 2, 1.8 ms), the no-peak duration T2 does not satisfy the condition that the duration is set to be from 4 ms to 13.6 ms in the above Condition 4, and the no-peak duration T2 does not satisfy the condition that the duration is set to be from 6 ms to 13.6 ms in the above Condition 7 (in Comparative Example 2, 18.6 ms).

Since Comparative Example 2 did not satisfy Condition 3, and parts of Condition 4 and Condition 7, the expulsion occurred, and also the welding result was NG. Specifically, in Comparative Example 2, the peak duration T1 was longer (1.8 ms) than in Condition 3 (from 0 to 0.9 ms). Consequently, the first nugget N1 and the second nugget N2 excessively grew, and protruded from a corona bond (an unmolten pressure welding portion formed outside the first nugget N1 and the second nugget N2). As a result, the first nugget N1 and the second nugget N2 were exposed and the expulsion occurred.

Furthermore, in Comparative Example 2, the no-peak duration T2 is longer (18.6 ms) than in Condition 4 and Condition 7 (4 ms to 13.6 ms, 6 ms to 13.6 ms), and hence cycle time lengthens, and a number of steps increases.

Additionally, in Comparative Example 2, the difference A5 between the upper limit current value A4 and the lower limit current value A3 is 0.85 kA, and hence the Example cannot be implemented to the welding of the car bodies for the mass production.

Comparative Example 3

In Comparative Example 3, the peak current value A1 was 14.6 kA, the effective current value A2 was 7.8 kA, the peak duration T1 was 2.7 ms, and the no-peak duration T2 was 18.1 ms. As a result, in Comparative Example 3, the lower limit current value A3 was 6.25 kA, the upper limit current value A4 was 6.85 kA, the difference A5 between the upper limit current value A4 and the lower limit current value A3 was 0.6 kA, the peak duration T1/the no-peak duration T2 was 0.149, the rising time T3/the falling time T4 was 0.17, furthermore, the expulsion occurred, and it was determined that the welding result was NG.

Comparative Example 3 satisfies the above Conditions 1, 2, 5, 6, 8 and 9, but the peak duration T1 does not satisfy Condition 3 that the duration is set to be from 0 to 0.9 ms (in Comparative Example 3, 2.7 ms), and the no-peak duration T2 does not satisfy the condition that the duration is set to be from 4 ms to 13.6 ms in the above Condition 4; and the no-peak duration T2 does not satisfy the condition that the duration is set to be from 6 ms to 13.6 ms, and the peak duration T1 does not satisfy the condition that the duration is set to be from ⅟₁₅ (0.066) to ⅟₁₀ (0.1) of the no-peak duration T2, in the above Condition 7 (in Comparative Example 3, 18.1 ms, 0.149).

Since Comparative Example 3 did not satisfy Condition 3, and parts of Condition 4 and Condition 7, the expulsion occurred, and also the welding result was NG. Specifically, in Comparative Example 3, the peak duration T1 was longer (2.7 ms) than in Condition 3 (from 0 to 0.9 ms). Consequently, the first nugget N1 and the second nugget N2 excessively grew, and protruded from a corona bond (an unmolten pressure welding portion formed outside the first nugget N1 and the second nugget N2). As a result, the first nugget N1 and the second nugget N2 were exposed and the expulsion occurred.

Furthermore, in Comparative Example 3, the no-peak duration T2 is longer (18.1 ms) than in Condition 4 and Condition 7 (4 ms, to 13.6 ms, 6 ms to 13.6 ms), and hence cycle time lengthens, and a number of steps increases.

Additionally, in Comparative Example 3, the difference A5 between the upper limit current value A4 and the lower limit current value A3 is 0.6 kA, and hence the Example cannot be implemented to the welding of the car bodies for the mass production.

Comparative Example 4

In Comparative Example 4, the peak current value A1 was 14.6 kA, the effective current value A2 was 7.8 kA, the peak duration T1 was 2.7 ms, and the no-peak duration T2 was 22.6 ms. As a result, in Comparative Example 4, the lower limit current value A3 was 6.25 kA, the upper limit current value A4 was 6.85 kA, the difference A5 between the upper limit current value A4 and the lower limit current value A3 was 0.6 kA, the peak duration T1/the no-peak duration T2 was 0.119, the rising time T3 the falling time T4 was 0.13, furthermore, the expulsion occurred, and it was determined that the welding result was NG.

Comparative Example 4 satisfies the above Conditions 1, 2, 5, 6, 8 and 9, but the peak duration T1 does not satisfy Condition 3 that the duration is set to be from 0 to 0.9 ms (in Comparative Example 4, 2.7 ms), and the no-peak duration T2 does not satisfy the condition that the duration is set to be from 4 ms to 13.6 ms in the above Condition 4; and the no-peak duration T2 does not satisfy the condition that the duration is set to be from 6 ms to 13.6 ms, and the peak duration T1 does not satisfy the condition that the duration is set to be from ⅟₁₅ (0.066) to ⅟₁₀ (0.1) of the no-peak duration T2, both in the above Condition 7 (in Comparative Example 4, 22.6 ms, 0.119).

Since Comparative Example 4 did not satisfy Condition 3, and parts of Condition 4 and Condition 7, the expulsion occurred, and also the welding result was NG. Specifically, in Comparative Example 4, the peak duration T1 was longer (2.7 ms) than in Condition 3 (from 0 to 0.9 ms). Consequently, the first nugget N1 and the second nugget N2 excessively grew, and protruded from a corona bond (an unmolten pressure welding portion formed outside the first nugget N1 and the second nugget N2). As a result, the first nugget N1 and the second nugget N2 were exposed and the expulsion occurred.

Furthermore, in Comparative Example 4, the no-peak duration T2 is longer (22.6 ms) than in Condition 4 and Condition 7 (4 ms to 13.6 ms, 6 ms to 13.6 ms), and hence cycle time lengthens, and a number of steps increases.

Additionally, in Comparative Example 4, the difference A5 between the upper limit current value A4 and the lower limit current value A3 is 0.6 kA, and hence the Example cannot be implemented to the welding of the car bodies for the mass production.

Comparative Example 5

In Comparative Example 5, the peak current value A1 was 7.8 kA, the effective current value A2 was 7.8 kA, the peak duration T1 was 597.4 ms, and the no-peak duration T2 was 2.6 ms. As a result, in Comparative Example 5, the lower limit current value A3 was 7.8 kA, the upper limit current value A4 was 7.8 kA, the difference A5 between the upper limit current value A4 and the lower limit current value A3 was 0 kA, the peak duration T1/the no-peak duration T2 was 229.77, the rising time T3/the falling time T4 was *, furthermore, the expulsion occurred, and it was determined that the welding result was NG.

Comparative Example 5 satisfies the above condition 1, 5, 8 and 9. However, in Comparative Example 5, the peak current value A1 does not satisfy Condition 2 that the value is set to be from 10.6 kA to 20 kA (in Comparative Example 5, 7.8 kA), and the peak duration T1 does not satisfy Condition 3 that the duration is set to be from 0 to 0.9 ms (in Comparative Example 5, 597.4 ms).

Furthermore, in Comparative Example 5, the no-peak duration T2 does not satisfy Condition 4 that the duration is set to be from 4 ms to 13.6 ms, and the peak duration T1 is set to ⅕ of the no-peak duration T2 or less (in Comparative Example 5, 2.6 ms, 229.77), and the effective current value A2 does not satisfy Condition 6 that the value is set to be from 0.5 times to 0.75 times as much as the peak current value A1 (in Comparative Example 5, 1.0 time).

The Comparative Example 5 does not satisfy Condition 7 that the effective current value A2 is set to be from 0.5 times to 0.6 times as much as the upper limit (the peak current value A1) of the peak current range (between the lower limit peak current value A6 and the peak current value A1), the no-peak duration T2 is set to be from 6 ms to 13.6 ms, and the peak duration T1 is set to be from 1/15 to 1/10 of the no peak duration T2 (in Comparative Example 5, 1.0 time, 2.6 ms, 229.77).

Since Comparative Example 5 did not satisfy Conditions 2 to 4, Condition 6 and Condition 7, the expulsion occurred, and the welding result was NG. Specifically, in Comparative Example 5, the peak current value A1 was lower (7.8 kA) than in Condition 2 (from 10.6 kA to 20 kA). Consequently, when the first nugget N1 that grew more slowly than the second nugget N2 grew to a size required for the welding, the second nugget N2 excessively grew to protrude from the corona bond. As a result, the second nugget N2 was exposed and the expulsion occurred.

Furthermore in Comparative Example 5, the peak duration T1 was longer (597.4 ms) than in Condition 3 (from 0 to 0.9 ms). Consequently, the first nugget N1 and the second nugget N2 excessively grew, and protruded from a corona bond (an unmolten pressure welding portion formed outside the first nugget N1 and the second nugget N2). As a result, the first nugget N1 and the second nugget N2 were exposed and the expulsion occurred.

Furthermore, in Comparative Example 5, the difference A5 between the upper limit current value A4 and the lower limit current value A3 is 0 kA, and hence the Example cannot be implemented to the welding of the car bodies for the mass production.

Thus, in Comparative Example 1 to Comparative Example 5 which did not satisfy at least one of the above Conditions 1 to 4, the expulsion occurred, and it was determined that the welding result was NG.

It can be seen from the experiment results of Examples 1 to 5 and Comparative Examples 1 to 5 that when the above Conditions 1 to 9 (at least the above Conditions 1 to 4) are satisfied, the welding can be successfully performed so that no expulsion occurs and the welding result is OK.

Note that also in case where the first metal plate W1 comprised a galvanized steel plate having a thickness of 0.65 mm and a tensile strength of 270 MPa, the second metal plate W2 comprised a galvanized steel plate having a thickness of 1.6 mm and a tensile strength of 980 MPa, and the third metal plate W3 comprised a non-plated steel plate having a thickness of 2.3 mm and a tensile strength of 780 MPa (a plate thickness ratio of 7), results similar to those of the above Examples 1 to 8 and Comparative Examples 1 to 5 were obtainable.

In the above embodiment, in the first to eighth Examples, the first to third metal plates W1 to W3 are welded, but the present invention can be implemented also to a spot welding method of welding a metal plate comprising four or more metal plates. Also, in this case, when at least the above Conditions 1 to 4 (preferably the above 1 to 9) are satisfied, the welding can be successfully performed so that no expulsion occurs and the welding result is OK.

Furthermore, all of the constituent elements shown in the above embodiments are not necessarily essential, and any selection from the constituent elements can be appropriately performed as long as the selection does not deviate from the spirit of the present invention.

REFERENCE SIGN LIST 10 spot welding apparatus

The invention claimed is:
1. A spot welding method comprising: joining, using pulse current, a laminate which comprises three or more superimposed metal plates, which is formed so that at least one metal plate of the three or more metal plates is different in thickness from the other metal plates, and in which a plate thickness ratio of a total thickness of the three or more metal plates to a thickness of the at least one metal plate is from 3.5 to 10, wherein
the pulse current has a pulsed waveform in which a no-peak state is repeatedly set, wherein the no-peak state is a state where after the pulse current has reached a set peak current value from a value lower than the peak current value, the pulse current decreases from the peak current value to bottom current which is set, and again increases to the peak current value, the peak current value is set to 10.6 kA or more, a no-peak duration which is a duration of the no-peak state is set to be from 4 ms to 13.6 ms, and a peak duration which is a duration of a state of being the peak current value is set to 0.9 ms or less, and $\frac{1}{5}$ of the no-peak duration or less.

2. A spot welding method comprising: joining, using pulse current, a laminate which comprises three or more superimposed metal plates, which is formed so that at least one metal plate of the three or more metal plates is different in thickness from the other metal plates, and in which a plate thickness ratio of a total thickness of the three or more metal plates to a thickness of the at least one metal plate is from 3.5 to 10, wherein the pulse current has a pulsed waveform in which a peak state and a no-peak state are alternately set, wherein the peak state is a state which starts at a time point when the pulse current reaches from a value lower than a lower limit value of a set peak current range to a peak current value which is an upper limit value of the peak current range, and continues until the pulse current decreases from the peak current value to the lower limit value of the peak current range, and the no-peak state is a state where after the peak state, the pulse current decreases from the lower limit value of the peak current range to bottom current which is set, and again increases to the peak current value, the peak current value is set to 10.6 kA or more, the no-peak duration which is a duration of the no-peak state is set to be from 4 ms to 13.6 ms, and a peak duration which is a duration of the peak state is set to 0.9 ms or less and $\frac{1}{5}$ of the no-peak duration or less.

3. The spot welding method according to claim 1, wherein the peak duration is set to be from 0 to 0.9 ms.

4. The spot welding method according to claim 1, wherein the peak current value is set to be from 10.6 kA to 20 kA.

5. The spot welding method according to claim 1, wherein the plate thickness ratio of the laminate is set to be from 4 to 7.

6. The spot welding method according to claim 1, wherein effective current of the pulse current in joining the laminate is set to be from 0.5 times to 0.75 times as much as the peak current value.

7. The spot welding method according to claim 1, wherein an effective current value of the pulse current in joining the laminate is set to be from 0.5 times to 0.6 times as much as the peak current value, the no-peak duration is set to be from 6 ms to 13 ms, and the peak duration is set to be from $\frac{1}{15}$ to $\frac{1}{10}$ of the no-peak duration.

8. The spot welding method according to claim 1, wherein rising time elapsed until the pulse current increases from the bottom current in the no-peak state to the peak current value is set to be shorter than falling time elapsed until the pulse current decreases from the peak current value to the bottom current, in the no-peak state.

9. The spot welding method according to claim 8, wherein the rising time is set to be from 0.1 times to 0.8 times as much as the falling time.

* * * * *